Nov. 10, 1953 S. J. BEGUN 2,658,762
MAGNETIC RECORD TRANSDUCING SYSTEM AND GUIDE STRUCTURE
Filed Dec. 23, 1948
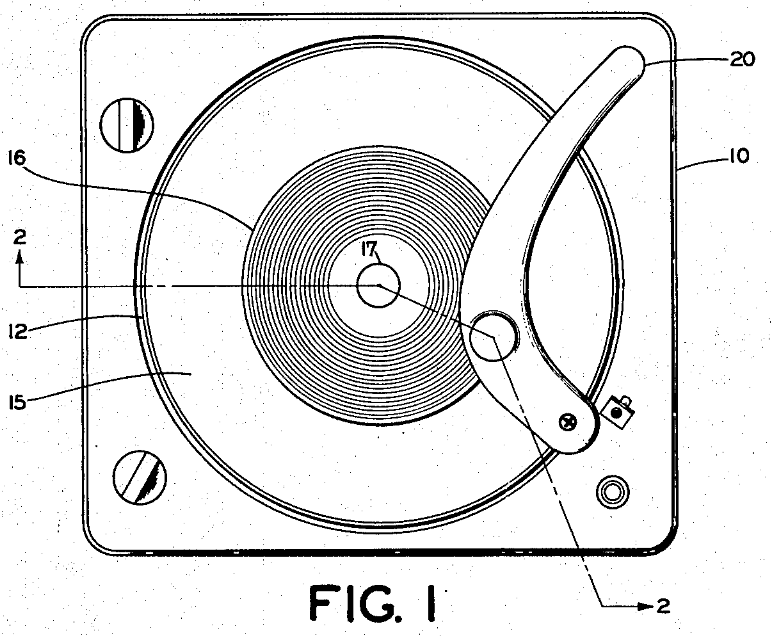
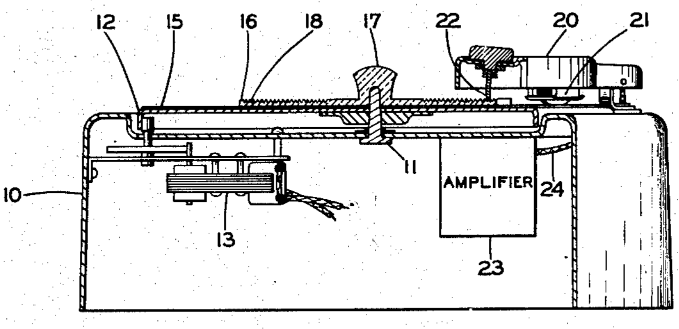
FIG. 2
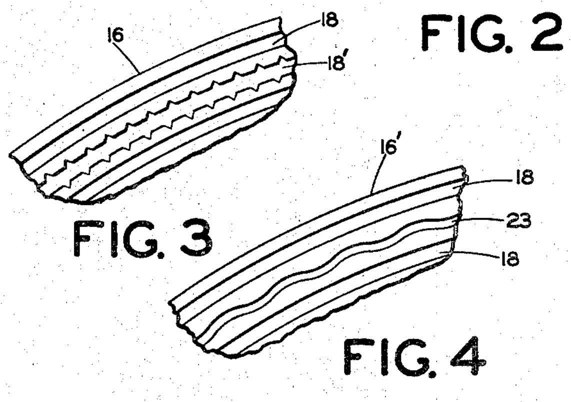
FIG. 3, FIG. 4
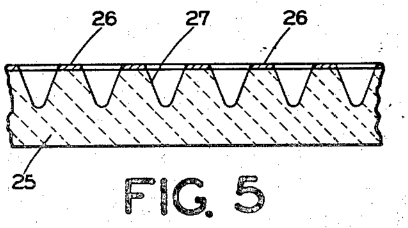
INVENTOR.
SEMI JOSEPH BEGUN
BY
Elmer J. Hyde
ATTORNEY Patented Nov. 10, 1953

2,658,762

UNITED STATES PATENT OFFICE 2,658,762

MAGNETIC RECORD TRANSDUCING SYSTEM AND GUIDE STRUCTURE

Semi Joseph Begun, Cleveland Heights, Ohio, assignor, by mesne assignments, to Clevite Corporation, Cleveland, Ohio, a corporation of Ohio Application December 23, 1948, Serial No. 66,960

6 Claims. (Cl. 274—13)

This invention pertains to a guide structure for a magnetic record transducing system and guide structure.

There has been developed a magnetic recording and reproducing device particularly adapted for dictating purposes wherein the message is recorded magnetically on a disk of flexible magnetizable material such as paper or plastic coated or impregnated with finely divided magnetizable iron oxide particles. When the disk is made of thin paper or plastic it can be folded, inserted in an envelope and mailed. The recipient can unfold the disk and play the message back on a recording-reproducing machine similar to the one used in the recording operation. A detailed description of the device may be found in U. S. application Serial Number 651,637, filed March 2, 1946, in the name of Alfred L. W. Williams, for Magnetic Recording and Reproducing, now abandoned, and assigned to the same assignee as the present invention.

Briefly, the device comprises a turntable which is rotated, the disk of magnetic material which is laid flat on the turntable, a guide structure which is spirally grooved and is laid on the turntable to cover a portion only of the disk of magnetic material, a guide arm including a guide stylu which runs in the groove of the guide structure and a magnetic transducer head which is thereby caused to spirally traverse the disk of magnetic material as the turntable and disk are rotated, and associated mechanisms for driving the turntable, a microphone, loudspeaker, amplifier, switches, etc.

It has been found that some operators dictating into the device do not realize when the record disk has been filled. They keep on talking into the machine with a resultant "piling up" of the message on the last spiral convolution of the record material. The "piled up" message is not intelligible upon reproduction, and when the operator finally becomes aware of the fact that he should have previously changed record disks, his continuity of thought is broken and he must play back the last part of his record to identify the last portion which was successfully recorded. Because of this there is a need for an inexpensive means for warning the operator as he records a message that he is nearing the end of the capacity of the record disk.

An object of the present invention is to provide an inexpensive yet reliable means for warning the operator of a magnetic recording and reproducing device when he is approaching the end of the record capacity.

A further object of the invention is to provide an inexpensive device having a minimum of movable parts for warning a person talking into a dictating machine that he is approaching the end of the unused record material.

For a better understanding of the present invention, together with other and further objects thereof, reference is had to the following description taken in connection with the accompanying drawings, and its scope will be pointed out in the appended claims.

In the single sheet of drawing,

Fig. 1 is a plan view of a magnetic record transducing system with which the invention may be used;

Fig. 2 is a sectional view taken along line 2—2 of Fig. 1; Figs. 3 to 4 are enlarged plan views of various types of guide disks embodying the invention; and Fig. 5 is an enlarged plan view of a structure which can combine the guide feature with the magnetic material.

In an aspect of the invention there is provided a guide structure for a magnetic record transducing system having an extended flexible disk magnetic record structure and a guide arm with a guide stylus and a transducer head. The guide structure comprises a plate-like member adapted to rest on and cover the central portion only of the disk record structure. The plate-like member includes grooves for cooperating with the guide stylus to guide the guide arm and the transducer head across the uncovered peripheral portion of the disk record as said disk record structure rotates. The grooves in the guide structure include an unmodulated portion and a modulated portion for vibrating the guide stylus and the guide arm.

With reference to the drawing there is shown in Figs. 1 and 2 a magnetic record transducing system particularly adapted for recording dictated messages such as letters. The system comprises a sheet metal base 10 on the top surface of which is rotatably mounted a spindle 11, and keyed to the spindle 11 for rotary motion is a turntable 12. A motor 13 is mounted inside the base 10 and drives the turntable. It is preferable to use a standard phonograph turntable motor and to drive the turntable at a rate of 20 revolutions per minute. This keeps the cost low and provides maximum recording time commensurate with adequate frequency response for dictating purposes. On the upper face of the turntable there is positioned a flexible disk magnetic record structure 15. This, preferably, is a sheet of paper or plastic having a layer of magnetizable material on one or more of its faces, or it may be a paper or plastic disk impregnated with magnetizable material.

The guide structure for the system may be separate from the record member or it may be integral with the record structure. For cost reasons and for ease in handling and mailing the record structure, it is preferable if the guide structure for the system comprises a separate plate-like member 16 have a centrally located knob 17. The knob 17 is hollow to receive the upwardly extending end of the spindle 11, and when in position the plate-like member 16 rests on and covers only the central portion of the magnetizable disk record structure 15, thereby holding the disk 15 firmly against the turntable 12. The plate-like member 16 includes a spiral groove 18 which preferably runs from the inside near the knob 17 toward the outside of the disk.

One end of a guide arm 20 is pivotably connected to the top plate of the base 10 so that it can swing parallel to the plane of the turntable 12 and can also be raised and lowered, similar to the motions of a phonograph tone arm. At the other end of the guide arm there is mounted a magnetic transducer head 21 adapted to both record records on the magnetic disk 15 and reproduce the records therefrom. The transducer head 21 is connected by wires 24 to an amplifier 23 mounted within the base 10. Suitable other equipment such as a microphone, switches for starting and stopping the turntable and for energizing the amplifier are not here shown in detail. For further details, reference may be had to the aforesaid Williams application.

The guide arm 20 also includes a guide stylus 22 suitably secured thereto. The stylus tip fits in the groove in the guide disk 16 so that as the turntable 12 rotates the stylus traces the spiral groove 18 and causes the guide arm 20 to move slowly out toward the peripheral edge of the magnetic disk 15, thereby causing the magnetic transducer head 21 to trace a spiral path on the disk 15.

It has been found in practice that an operator might dictate into the system for a length of time longer than the capacity of the machine. This means that some of the message is lost as the guide stylus continually traces the outermost groove of the guide plate 16 thereby causing the magnetic transducer head 21 to repeatedly trace a single track at the outside edge of the magnetizable disk 15.

To warn the operator when he is nearing the outside edge of the magnetizable record disk, the groove 18′ near the outside edge of the guide plate 16 is modulated. This vibrates the guide stylus which is rigidly connected to the guide arm 20 and consequently vibrates the guide arm. This makes a buzzing sound sufficiently loud to attract the attention of the operator and he knows that it will very soon be time to replace the recorded disk 15 with an unrecorded disk.

It has been found that a frequency modulated signal is preferable to a constant frequency signal for attracting the operator's attention. This is because a signal which rises and falls in pitch is more noticeable than a signal of constant tone. A signal which has been found to be excellent in its warning characteristic starts at a low frequency, zero cycles per second for example, and sweeps up to a higher frequency, 1000 cycles per second for example. The sweep frequency preferably is set at 5 times per second, although of course other sweep frequencies and other frequency ranges may obviously be used.

The modulated groove 18′ may either be molded into the groove at the time the disk 16 and its groove 18 are formed, or it may be cut into a portion of the groove 18 after the disk 16 has been made.

Fig. 3 shows the appearance, enlarged considerably, of the unmodulated grooves 18 and of the modulated groove 18′ where the modulations have been cut after the guide disk 16 was formed. It has been found that a phonograph record cutter will do a good job of cutting the modulations. Because the grooves are considerably wider than the cutter stylus the side walls of the modulated groove appear to be notched, as shown in Fig. 3. The guide stylus 22 is considerably wider than the cutter stylus and accordingly the notches in the side wall of the groove 18′ actuate it sidewise and thereby shake the guide arm 20. A satisfactory guide groove of the type shown in Fig. 3 has been found to be .01 inch deep with about a 3 mil radius on the bottom and an angle between the side walls of about 60 degrees. Forty grooves per inch are practical with this construction.

Fig. 4 shows a guide disk 16′ having a modulated groove 23. When the warning groove is molded into the disk 16 simultaneously with the forming of the grooves 18 it is preferable to have a groove of the type shown in Fig. 4. The depth of the groove 23, the number of lines per inch, etc., are similar to those given for Fig. 3.

Fig. 5 illustrates, by an enlarged sectional view, a modified type of device wherein the magnetic record member is not separate and distinct from the guide member. In Fig. 5 the composite record and guide structure 25 may be made in accordance with the United States Patent 2,381,463, issued to R. K. Potter on August 7, 1945. The magnetic record portion of the structure is identified by reference character 26 and is in the form of a spiral track on a disk. A spiral groove 27 is provided in which one or more guide stylus means may run for guiding a magnetic transducing head along the spiral path of the magnetic material 26. In accordance with this invention the spiral groove 27 may be laterally modulated as in Fig. 3 or 4, or it may be vertically modulated to vibrate the guide arm and give a warning. It is also possible to vertically modulate the groove of the guide disks 16 or 16′.

It is within the scope of this invention that the guide structure shown in Figs. 1 and 2 and that shown in Fig. 5 have more than one warning section. For example: a short warning section may be provided to inform the operator that he has 30 seconds more recording time available, and this may be followed by a warning section showing only 5 more seconds recording time.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim as my invention:

1. In combination, a magnetic record transducing system including an extended disk magnetic record structure, a guide arm with a guide stylus and a transducer head; and a plate-like guide member adapted to rest on and cover the central portion only of said disk record structure, said plate-like member including grooves for cooperating with said guide stylus to guide said guide arm and said transducer head across the uncovered peripheral portion of said disk record structure as said disk record structure rotates, said grooves including an unmodulated portion for guiding said transducer head across the initial portion of said disk record structure and a modulated warning portion for guiding said transducer head across the end portion of said disk record structure and for vibrating said guide stylus and said guide arm to warn the operator.

2. In combination: a plate-like guide structure having a guide track and a magnetic record transducing system including a flexible record structure having an extended surface, a guide arm, a transducer head connected to said guide arm for cooperating with said record structure, and a guide stylus connected to said guide arm and adapted to engage said guide track for guiding said guide arm and said transducer head across said record structure; said guide structure including an initial smooth track portion and a final uniformly modulated track portion for vibrating said guide stylus and said guide arm to provide an audible signal.

3. A guide structure as set forth in claim 2, further characterized by said track comprising a groove.

4. A guide structure as set forth in claim 3, further characterized by said groove being laterally modulated.

5. A guide structure as set forth in claim 3, further characterized by said groove, upon being traversed by said guide stylus during reproduction of the magnetic signal on said record structure, vibrating said guide stylus and said guide arm at a frequency varying periodically between about zero cycles per second and 1000 cycles per second.

6. A guide structure as set forth in claim 5, further characterized by said period being about .2 of a second.

SEMI JOSEPH BEGUN.

References Cited in the file of this patent

UNITED STATES PATENTS

| Number | Name | Date |
|---|---|---|
| 714,707 | Jones | Dec. 2, 1902 |
| 746,806 | Fedeler | Dec. 15, 1903 |
| 759,348 | Clark | May 10, 1904 |
| 908,778 | Lamb | Jan. 5, 1909 |
| 1,959,423 | Harrison | May 22, 1934 |
| 2,142,591 | Ross | Jan. 3, 1939 |
| 2,240,305 | Koch | Apr. 29, 1941 |
| 2,278,678 | Stone | Apr. 7, 1942 |

FOREIGN PATENTS

| Number | Country | Date |
|---|---|---|
| 352,391 | Great Britain | June 29, 1931 |
| 613,925 | Germany | May 29, 1935 |